United States Patent
Beller et al.

(10) Patent No.: US 9,914,457 B2
(45) Date of Patent: Mar. 13, 2018

(54) METHOD FOR SETTING A CLUTCH TORQUE

(71) Applicant: Dr. Ing. h.c. F. Porsche Aktiengesellschaft, Stuttgart (DE)

(72) Inventors: Dimitri Beller, Pforzheim (DE); Bjoern Sieland, Eberdingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 260 days.

(21) Appl. No.: 14/710,607

(22) Filed: May 13, 2015

(65) Prior Publication Data

US 2015/0329118 A1 Nov. 19, 2015

(30) Foreign Application Priority Data

May 16, 2014 (DE) .................. 10 2014 106 922

(51) Int. Cl.
| | |
|---|---|
| *B60W 10/06* | (2006.01) |
| *B60W 10/02* | (2006.01) |
| *B60W 30/18* | (2012.01) |
| *F16D 48/06* | (2006.01) |
| *F16D 48/08* | (2006.01) |

(52) U.S. Cl.
CPC ...... *B60W 30/18027* (2013.01); *B60W 10/02* (2013.01); *B60W 10/06* (2013.01); *F16D 48/06* (2013.01); *F16D 48/08* (2013.01); *B60W 2510/0638* (2013.01); *B60W 2510/182* (2013.01); *B60W 2540/10* (2013.01); *B60W 2710/027* (2013.01); *F16D 2500/10412* (2013.01); *F16D 2500/3065* (2013.01); *F16D 2500/3067* (2013.01); *F16D 2500/3101* (2013.01); *F16D 2500/50224* (2013.01); *F16D 2500/50287* (2013.01); *F16D 2500/7027* (2013.01); *F16D 2500/7044* (2013.01); *F16D 2500/70605* (2013.01); *Y10T 477/743* (2015.01); *Y10T 477/753* (2015.01)

(58) Field of Classification Search
CPC ................. B60W 10/02; B60W 10/06; B60W 30/18027; B60W 2510/0638
See application file for complete search history.

(56) References Cited

U.S. PATENT DOCUMENTS

| | | | |
|---|---|---|---|
| 4,685,062 | A | 8/1987 | Uriuhara et al. |
| 5,989,153 | A | 11/1999 | Fischer et al. |
| 6,358,186 | B1 | 3/2002 | Kosik et al. |

(Continued)

FOREIGN PATENT DOCUMENTS

| | | |
|---|---|---|
| DE | 3447676 A1 | 8/1985 |
| DE | 19609878 A1 | 9/1996 |
| DE | 19711618 A1 | 10/1997 |

(Continued)

*Primary Examiner* — Huan Le
(74) *Attorney, Agent, or Firm* — Leydig, Voit & Mayer, Ltd.

(57) ABSTRACT

A method for setting a clutch torque between an engine and a drive of a vehicle during a starting process of the vehicle includes increasing the clutch torque during a first phase, limiting the clutch torque to a first torque value during the first phase, and further increasing the clutch torque in a second phase after an engine rotational speed reaches a rotational speed limit.

18 Claims, 2 Drawing Sheets

(56) References Cited

U.S. PATENT DOCUMENTS

2010/0063695 A1* 3/2010 Sakaue ................ B60W 10/02
　　　　　　　　　　　　　　　　　　　　701/54
2016/0229387 A1* 8/2016 Hata ...................... B60K 6/365

FOREIGN PATENT DOCUMENTS

| DE | 19716828 A1 | 11/1997 | | |
| DE | 10330951 A1 | 1/2005 | | |
| WO | WO-2015044754 A1 * | 4/2015 | ............. | B60K 6/365 |

* cited by examiner

METHOD FOR SETTING A CLUTCH TORQUE

CROSS REFERENCE TO RELATED APPLICATIONS

Priority is claimed to German Patent Application No. DE 10 2014 106 922.6, filed on May 16, 2014, the entire disclosure of which is hereby incorporated by reference herein.

FIELD

The invention relates to a method for setting a clutch torque 1, and to a control unit for carrying out the method.

BACKGROUND

DE 103 30 951 A1 discloses a method for operating a drive train of a motor vehicle. When a power requirement occurs, for example during an acceleration phase, internal combustion engines with turbocharging develop their torque unevenly and with a certain degree of delay. In order to avoid these disadvantages it is proposed that in the event of an increase in the power presetting by the vehicle driver, a slip is set at the clutch in order to increase the rotational speed of the internal combustion engine and of the exhaust gas turbocharger in a chronologically limited fashion. The method therefore permits a very fast and spontaneous reaction of the internal combustion engine to a change in the power presetting by the vehicle driver.

SUMMARY

In an embodiment, the present invention provides a method for setting a clutch torque between an engine and a drive of a vehicle during a starting process of the vehicle. The method includes increasing the clutch torque during a first phase, limiting the clutch torque to a first torque value during the first phase, and further increasing the clutch torque in a second phase after an engine rotational speed reaches a rotational speed limit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
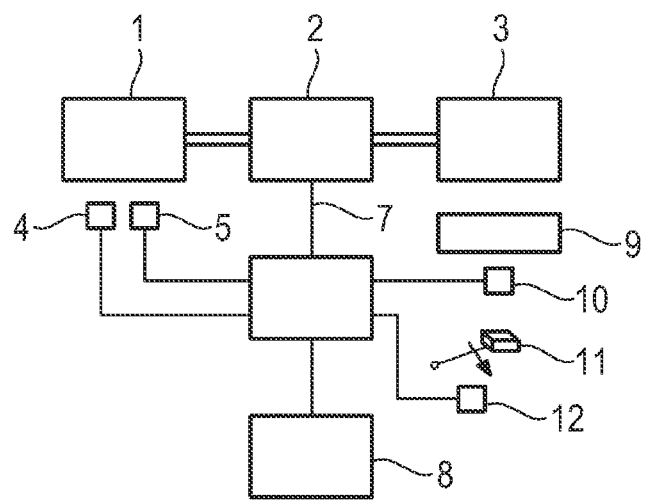
FIG. 1 shows a schematic partial detail of a vehicle.

An embodiment of the invention makes available an improved method for setting a clutch torque during a starting phase of the vehicle.

In an embodiment of the invention, the starting phase of the vehicle is improved. In particular, an increased starting acceleration of the vehicle can be achieved. The described method can be used, in particular, for turbo-charged engines with exhaust gas turbochargers. The described advantages are achieved in that a controlled delay in the build-up of clutch torque is used. This is achieved in that in a first phase of the starting process the clutch torque is limited to a first torque value. The clutch torque is only increased further in a second phase after a predefined rotational speed limit of the engine has been reached. This ensures that owing to the low clutch torque during the first phase with low loading, the engine can rev up quickly up to the predefined rotational speed limit. As a result, within a relatively short time, a relatively high rotational speed of the engine, and therefore a relatively high torque and a relatively high power are available. The clutch torque is not increased further until after the relatively high power and relatively high torque are reached. As a result, a relatively high starting acceleration of the vehicle is achieved overall.

In a further embodiment, a further improvement in the starting process of the vehicle is achieved. This becomes possible by virtue of the fact that after the predefined rotational speed limit of the engine is reached in the second phase, the clutch torque is increased in accordance with a first time behavior, wherein after a predefined torque limit is reached, the clutch torque is increased further in accordance with a second time behavior. The first time behavior constitutes a faster increase in the clutch torque over time than the second time behavior. Owing to this procedure, a rapid increase in the torque over time is achieved at the drive of the vehicle at the start of the second phase. This permits improved acceleration of the vehicle. A more rapid rise in the torque at the drive can therefore take place. As a result, an increased acceleration of the vehicle is subjectively perceived by the driver.

In one embodiment, during the second phase the clutch torque increases linearly over time up to the predefined torque limit. A simple and rapid increase in the torque at the drive of the vehicle is therefore achieved.

In a further embodiment, a gentle frictional engagement is achieved between the engine and the drive by virtue of the fact that in the third phase the clutch torque rises as a function of the driver's request. In the third phase, the engine is as a rule in a high torque range in which sufficient torque is available for the drive even when the clutch is not yet completely closed. In this phase, it may be advantageous to set the rise in the clutch torque as a function of the driver's request.

In a further embodiment, a simple means of obtaining the clutch torque during the third phase is made available. This is achieved in that during the third phase the clutch torque is calculated with a multiplication of the driver's request by a predefined function. Good adaptation of the clutch torque to the operating state of the engine is achieved by virtue of the fact that the function depends on the rotational speed of the engine, wherein the function is made available, for example, as a characteristic curve dependent on the rotational speed. As a result, costly calculation methods for obtaining the clutch torque during the third phase are avoided.

In a further embodiment, the first phase is started as a function of the brake pressure. In particular, the first phase can be started when the brake pressure undershoots a predefined value, in particular approaches a value of 0. The acceleration process of the vehicle can therefore be carried out more quickly, since triggering of the brake simultaneously constitutes a signal for a subsequent starting process.

In a further embodiment, in the first phase the clutch torque is limited to a low torque. The low torque is, for example, less than 5% of the maximum torque of the engine. The limitation to the low torque prevents the vehicle from starting above a crawling speed of 1 km/h. The clutch is therefore already activated, but no significant torque is yet transmitted. As a result, fast revving up of the engine and therefore fast provision of a high torque and/or of a high power can be achieved.

Depending on the embodiment selected, the clutch torque can increase further after the detection of a driver's request to start the vehicle. However, the increase is limited to a clutch torque which keeps the loading for the engine low and does not significantly impede rapid revving up of the engine.

In a further embodiment, the predefined rotational speed limit depends on an idling rotational speed of the engine. The method can therefore be applied for various engine types with different characteristics, in particular different idling rotational speeds. In one simple embodiment, the rotational speed limit is calculated from a sum of the idling rotational speed and a constant rotational speed value.

In a further embodiment, the torque limit is obtained as a function of a driver's request. In this case, the torque limit is set higher the greater the driver's request. An adapted sporty starting style of the vehicle can therefore be achieved as a function of the driver's request.

In one simple embodiment, the torque limit is calculated with a multiplication of the driver's request by a constant. As a result, a simple method for obtaining the torque limit may be made available.

In a further embodiment, the method is carried out if the driver's request for acceleration of the vehicle is above a predefined acceleration value. For example, the driver's request can be detected by detecting the activation speed of the gas pedal. If the activation speed of the gas pedal is above a predefined speed, a driver's request for an acceleration above the predefined acceleration value is detected.

FIG. 1 is a schematic illustration of part of a vehicle having an engine 1, which is embodied, for example, as an internal combustion engine, in particular as a turbo-charged engine with an exhaust gas turbocharger. The engine 1 is connected via a clutch 2 to a drive 3 of the vehicle. The drive 3 has a transmission, wherein a transmission input is connected to an output of the clutch 2. In addition, a rev counter 4 and a torque meter 5 are provided and are assigned to the engine 1. The rev counter 4 detects the rotational speed of the engine 1 and passes on the rotational speed to a control unit 6. The torque sensor 5 detects the torque generated by the engine 1 and passes on the detected torque to the control unit 6. The control unit 6 is connected to the clutch 2 via a control line 7. The control unit 6 is designed to set or adjust the clutch torque of the clutch 2. In addition, the control unit 6 is connected to a data memory 8. Furthermore, a brake system 9 is provided which brakes at least one wheel of the vehicle. The brake system 9 presets a brake pressure for at least one wheel. The brake pressure is detected with a first sensor 10 and signaled to the control unit 6. The brake system 9 can be, for example, an automatic parking brake or can be generated by a driver of the vehicle by means of a brake pedal. The brake system can be embodied as an electric or hydraulic brake system.

Furthermore, an input means 11 is provided for a driver's request for a torque of the engine 1 or an acceleration of the vehicle. The input means 11 can be embodied, for example, in the form of a gas pedal or in the form of a joystick. In addition, a second sensor 12 is provided which detects the driver's request and passes it on to the control unit 6.

Figure 2:
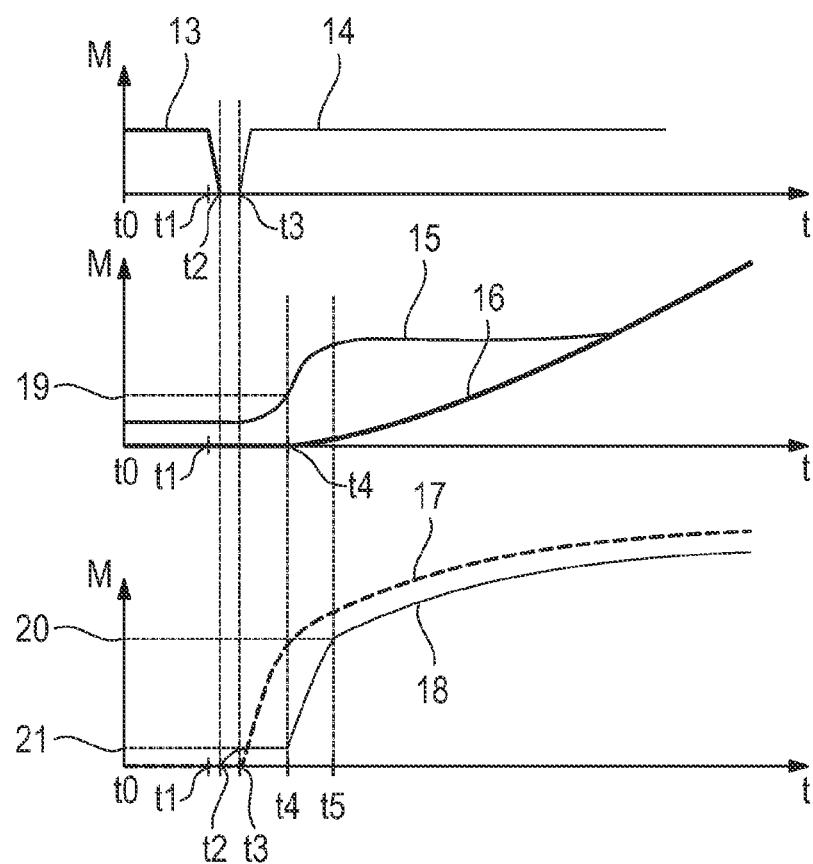
FIG. 2 shows diagrams of the clutch torque, the rotational speed of the engine, the brake pressure and the gas pedal.

On the basis of the diagrams in FIG. 2, starting functions, i.e. methods for setting a clutch torque during the starting of a vehicle are described. One concept of the method is to implement a controlled delay in the build-up of the clutch torque during the starting of the vehicle. The controlled delay in the build-up of the clutch torque is selected in such a way that a specific engine rotational speed at which a relatively high engine power is available is reached more quickly. As a consequence of this, after the relatively high engine rotational speed is reached, the clutch torque can be increased more quickly, with the result that a relatively high starting acceleration of the vehicle is made possible and, in particular, is perceived by the driver.

FIG. 2 shows, in the top diagram, a profile of a brake pressure 13 and a profile of a driver's request 14. In the center diagram, the rotational speed n of the engine is plotted along the ordinate, and the time t along the abscissa. In addition, in the center diagram a characteristic curve of the engine rotational speed 15 and a characteristic curve of the transmission input rotational speed 16 are plotted against the time t.

In the bottom diagram, a torque M is plotted on the ordinate, and the time t on the abscissa. In the bottom diagram, a characteristic curve of a driver's request torque 17 and a characteristic curve of a clutch torque 18 are plotted. The clutch torque can also constitute a setpoint clutch torque of an adjustment means of the clutch torque. The three diagrams are aligned with one another in a synchronous fashion.

At a zero time t0, the vehicle is in a stationary state, the brake pressure 13 is at a maximum value, the engine rotational speed 15 corresponds to an idling rotational speed, and the driver's request torque 17 is equal to 0. At this time the driver would not like to start. At a subsequent first time t1, the brake is released and the brake pressure 13 drops until the brake pressure 13 reaches a value near to 0 or the value 0 at a second time t2. In the selected embodiment, the dropping of the brake pressure 13 below a predefined value, in particular below a predefined value of, for example, below 5% of the maximum value into a range from the value 0 to the second time t2 is detected as the start of a first phase. The control unit 6 detects the dropping of the brake pressure below the predefined value and therefore increases the clutch torque starting from the second time t2 up to a first torque value which corresponds to a low torque 21. The low torque 21 corresponds, for example, to a crawling torque at which the vehicle starts to move at a crawling speed of <1 km/h. Depending on the selected embodiment, a smaller or larger value can also be selected for the low torque. The value for the low torque 21 is stored in the data memory 8.

The engine rotational speed 15 remains unchanged at the idling rotational speed starting from the zero time t0 up to the third time t3. At a third time t3, a driver's request 14 is detected by the second sensor 12 and signaled to the control unit 6. In the diagram, the rise in the driver's request torque 17 is illustrated at the third time t3. Since the control unit 6 detects, at the third time t3, a driver's request for an increased torque and therefore for an acceleration of the vehicle, the control unit 6 actuates the injection of the engine or the engine correspondingly in such a way that the engine outputs the driver's request torque. The engine rotational speed 15 therefore rises.

During a first phase, the clutch torque is limited by the control unit 6 to the low torque 21 even after the third time t3, until the engine rotational speed 15 reaches a predefined rotational speed limit 19 at a fourth time t4. When the rotational speed limit 19 is reached, the control unit 6 increases the clutch torque until the torque of the engine 1 is reached, i.e. until the clutch closes completely. Various methods can be used here.

In one simple embodiment, the clutch torque is increased starting from the fourth time t4, for example dependent on a predefined function, until the clutch closes completely. In a further embodiment, after the fourth time t4 during a second phase, the control unit 6 can increase the clutch torque 18 in accordance with a first time behavior. After the fifth time t5, the control unit 6 increases the clutch torque during a third phase in accordance with a second time behavior, wherein the increase in the clutch torque during the second phase has a greater time gradient than during the third phase. The fifth time t5 can be defined in various ways. For example, the fifth time t5 is defined by virtue of the fact that the engine 1 reaches a predefined torque limit 20. Instead of a torque limit, a power limit or a further rotational speed limit can also be used.

In one embodiment, during the second phase the control unit 6 increases the clutch torque linearly over time, between the fourth time t4 and the fifth time t5. The linear rise in the clutch torque during the second phase is selected in such a way that a high, preferably maximum, vehicle acceleration is achieved. In a further embodiment, the control unit 6 increases the clutch torque during the third phase as a function of the driver's request, i.e. as a function of the magnitude of the driver's request. During the third phase the control unit 6 can, for example, calculate the clutch torque as a function of a multiplication of the driver's request by a predefined function. The predefined function is stored in the data memory 8. The rotational speed limit 19 and/or the torque limit 20 are also stored in the data memory 8. In a further embodiment, the function depends on the engine rotational speed 15 of the engine 1 and is stored, in particular, in the form of a characteristic curve in the data memory 8.

Depending on the selected embodiment, the control unit 6 can start the increase in the clutch torque from the value 0 only after the detection of a driver's request, i.e. at the third time t3. In this embodiment, there is no clutch torque applied to the clutch during a first phase between the first time t1 and the third time t3. This simplifies the method, since the brake pressure does not have to be monitored.

In the illustrated embodiment, the clutch torque is kept approximately constant in the first phase between the third time t3 and the fourth time t4. Depending on the selected embodiment, the clutch torque can also rise further, but without the revving up of the engine being excessively braked. Depending on the selected embodiment, the rotational speed limit can be calculated from the idling rotational speed of the engine and a defined rotational speed value which is stored in the memory 8. Depending on the magnitude of the rotational speed value, the delay up to the build-up of the clutch torque can be varied. The starting process is ended as soon as the transmission input rotational speed 16 corresponds to the engine rotational speed 15.

Figure 3:
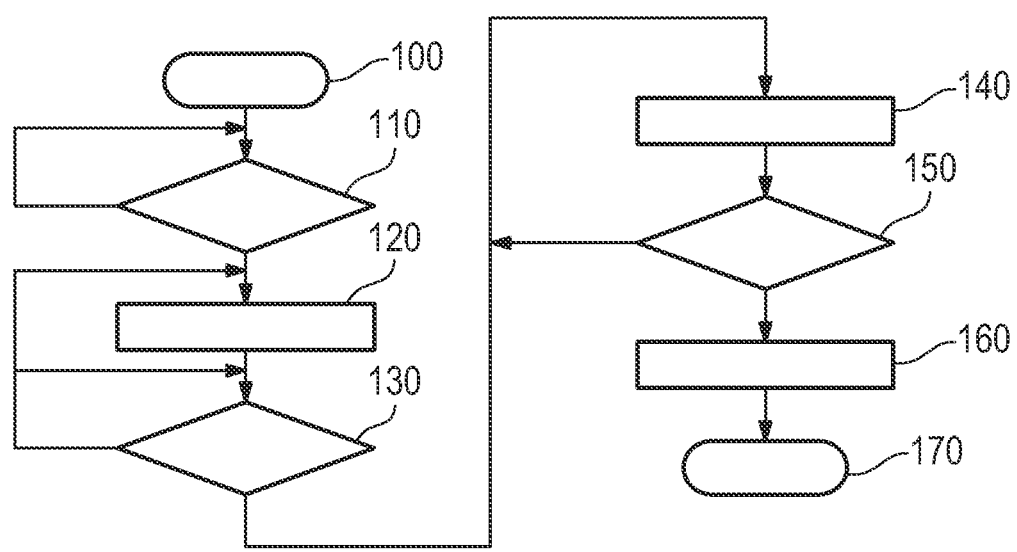
FIG. 3 shows a schematic program sequence for carrying out a method for setting a clutch torque.

FIG. 3 shows the execution of the method in a schematic program sequence. At the program point 100, which corresponds to the zero time t0, the vehicle is stationary, the engine is running with the idling rotational speed and the brake system for holding the vehicle in the parked position is active. Then, at the program point 110, the interrogation occurs as to whether the brake pressure 13 has dropped below the predefined value, in particular whether the brake system is pressureless. If this is not the case, branching back occurs to the input of the program point 110 and the interrogation of the program point 110 is repeated. If the interrogation at the second program point 110 reveals that the brake pressure has dropped below the predefined value, branching to program point 120 occurs. This state corresponds to the second time t2. At the program point 120, a clutch torque is built up which corresponds to a low torque 21, for example a crawling torque. Then, branching occurs to the program point 130. In parallel with this, the control unit 6 detects the driver's request torque and correspondingly accelerates the engine with the result that the rotational speed of the engine increases rapidly owing to the low clutch torque. At the program point 130, the interrogation as to whether the engine rotational speed 15 has reached the rotational speed limit 19 occurs. If this is not the case, branching back to the input of program point 130 occurs and the interrogation is carried out again by the program point 130. When the engine rotational speed 15 reaches the rotational speed limit 19, branching to program point 140 occurs.

As has already been stated above, the build-up of the low torque 21 independently of the brake pressure can also not occur until the third time t3 when a driver's request is detected.

At the program point 140, which corresponds to the fourth time t4, the clutch torque is built up in accordance with a first time behavior, for example linearly over time. At a following program point 150 it is checked whether the clutch torque has reached the torque limit 20. If this is not the case, branching back to program point 140 occurs and the clutch torque continues to be built up in accordance with the first behavior.

However, if the interrogation at program point 150 reveals that the clutch torque has reached the torque limit 20, branching to program point 160 occurs and the clutch torque is built up in accordance with a second time behavior. In this context, the clutch torque can be obtained as a function of the driver's request and a function. The function can depend, for example, on the rotational speed and be stored in the data memory 8. At a following program point 170, the method is ended if the transmission input rotational speed 16 corresponds to the engine rotational speed 15.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for setting a clutch torque between an engine and a drive of a vehicle during a starting process of the vehicle, the method comprising:
   increasing the clutch torque during a first phase,
   limiting the clutch torque to a first torque value during the first phase, and
   further increasing the clutch torque in a second phase after an engine rotational speed increases above a rotational speed limit,
   wherein in the second phase the clutch torque is increased in accordance with a first time behavior,
   wherein, after a predefined torque limit is reached, the clutch torque is increased in accordance with a second time behavior in a third phase,
   wherein, the first time behavior constitutes a faster increase in the clutch torque over time than the second time behavior.

2. The method as recited in claim 1, wherein during the second phase the clutch torque is increased linearly over time.

3. The method as recited in claim 1, wherein during the third phase the clutch torque is increased as a function of a driver's request.

4. The method as recited in claim 3, wherein during the third phase the clutch torque is calculated from a multiplication of the driver's request by a predefined function.

5. The method as recited in claim 4, wherein the predefined function is a predefined function of engine rotational speed.

6. The method as recited in claim 5, wherein the predefined function is a characteristic curve that varies with engine rotational speed.

7. The method as recited in claim 1, wherein the first phase is started as a function of a brake pressure of the vehicle.

8. The method as recited in claim 7, wherein the first phase is started when the brake pressure approaches a predefined value.

9. The method as recited in claim 8, wherein the first phase is started when the brake pressure undershoots a predefined value.

10. The method as recited in claim 1, wherein the clutch torque is limited during the first phase to a torque of 5% of a maximum torque of the engine.

11. The method as recited in claim 1, wherein the rotational speed limit is based on an idling rotational speed of the engine.

12. The method as recited in claim 11, wherein the rotational speed limit is calculated from a sum of the idling rotational speed and a constant rotational speed value.

13. The method as recited in claim 1, wherein the first torque value is obtained as a function of a driver's request.

14. The method as recited in claim 13, wherein the first torque value is calculated with a multiplication of the driver's request by a constant.

15. The method as recited in claim 13, wherein the method is carried out if the driver's request indicates an acceleration above a predefined threshold value.

16. The method as recited in claim 15, wherein the method is carried out if activation of a gas pedal for inputting the driver's request exceeds a predefined speed.

17. A control unit configured to carry out a method for setting a clutch torque between an engine and a drive of a vehicle during a starting process of the vehicle, the control unit being configured to:
   increase the clutch torque during a first phase,
   limit the clutch torque to a first torque value during the first phase, and
   further increase the clutch torque in a second phase after an engine rotational speed increases above a rotational speed limit,
   wherein in the second phase the clutch torque is increased in accordance with a first time behavior,
   wherein, after a predefined torque limit is reached, the clutch torque is increased in accordance with a second time behavior in a third phase,
   wherein, the first time behavior constitutes a faster increase in the clutch torque over time than the second time behavior.

18. A method for setting a clutch torque between an engine and a drive of a vehicle during a starting process of the vehicle, the method comprising:
   increasing the clutch torque during a first phase,
   limiting the clutch torque to a first torque value during the first phase, and
   further increasing the clutch torque in a second phase after an engine rotational speed increases above a rotational speed limit,
   wherein the first phase is started as a function of a brake pressure of the vehicle.

* * * * *